(12) United States Patent
Delker et al.

(10) Patent No.: US 8,341,717 B1
(45) Date of Patent: Dec. 25, 2012

(54) DYNAMIC NETWORK POLICIES BASED ON DEVICE CLASSIFICATION

(75) Inventors: Jason R. Delker, Olathe, KS (US); John M. Everson, Leawood, KS (US); James W. Norris, Kansas City, MO (US); Carol A. Ross, Shawnee, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1058 days.

(21) Appl. No.: 12/270,554

(22) Filed: Nov. 13, 2008

(51) Int. Cl.
  *H04L 29/06* (2006.01)
  *G06F 15/16* (2006.01)
  *G06F 21/00* (2006.01)

(52) U.S. Cl. .................. 726/10; 726/1; 726/4; 713/156; 713/175; 705/56

(58) Field of Classification Search .................. None
See application file for complete search history.

(56) References Cited

U.S. PATENT DOCUMENTS

| | | | |
|---|---|---|---|
| 6,088,801 A * | 7/2000 | Grecsek ............................ | 726/1 |
| 6,539,388 B1 * | 3/2003 | Hattori et al. ......................... | 1/1 |
| 7,606,232 B1 | 10/2009 | Ruben et al. | |
| 7,684,438 B2 * | 3/2010 | Stephens et al. .............. | 370/466 |
| 7,698,394 B2 * | 4/2010 | Helmerich .................... | 709/222 |
| 8,032,942 B2 * | 10/2011 | Smith et al. ....................... | 726/27 |
| 8,059,641 B1 | 11/2011 | Rai | |
| 2002/0009078 A1 | 1/2002 | Wilson et al. | |
| 2002/0112052 A1 * | 8/2002 | Brittingham et al. ......... | 709/224 |
| 2003/0084165 A1 | 5/2003 | Kjellberg et al. | |
| 2003/0217148 A1 | 11/2003 | Mullen et al. | |
| 2004/0218538 A1 | 11/2004 | Wiedeman et al. | |
| 2005/0165953 A1 | 7/2005 | Oba et al. | |
| 2005/0210241 A1 * | 9/2005 | Lee et al. ....................... | 713/158 |
| 2006/0168648 A1 | 7/2006 | Vank et al. | |
| 2006/0206933 A1 | 9/2006 | Molen et al. | |
| 2006/0250979 A1 | 11/2006 | Gauweiler et al. | |
| 2006/0259624 A1 | 11/2006 | Hu et al. | |
| 2006/0268749 A1 | 11/2006 | Rahman et al. | |
| 2006/0274744 A1 | 12/2006 | Nagai et al. | |
| 2006/0274774 A1 * | 12/2006 | Srinivasan et al. ............ | 370/420 |
| 2007/0250833 A1 * | 10/2007 | Araujo et al. ..................... | 718/1 |
| 2007/0266432 A1 | 11/2007 | Hara et al. | |
| 2008/0172492 A1 | 7/2008 | Raghunath et al. | |
| 2008/0198858 A1 | 8/2008 | Townsley et al. | |

(Continued)

OTHER PUBLICATIONS

First Action Interview Pre-Interview Communication dated May 1, 2012, U.S. Appl. No. 12/270,568, filed Nov. 13, 2008.

(Continued)

*Primary Examiner* — Christopher Revak

(57) ABSTRACT

A dynamic network policies system based on device classification is provided. The system comprises a computer system, a configuration database, and a dynamic network policies application based on device classification that receives a message from a virtual local area network access component containing a device identity certificate. The application parses the device identity certificate to discover a device classification, references the configuration database to determine a network policy associated with the device classification, and associates the network policy with a virtual local area network definition. The application also sends a reply containing the virtual local area network definition to the virtual local area network access component in response to the request, wherein access to network services is made available by association with a virtual local area network, and wherein association with a virtual local network is specific to the device classification and the network policy.

20 Claims, 6 Drawing Sheets

U.S. PATENT DOCUMENTS

| | | |
|---|---|---|
| 2008/0270606 A1 | 10/2008 | Gooch et al. |
| 2008/0285557 A1 | 11/2008 | Zheng et al. |
| 2008/0320585 A1 | 12/2008 | Ansari et al. |
| 2009/0006585 A1 | 1/2009 | Chen |
| 2009/0178119 A1 | 7/2009 | Macauley |
| 2009/0199285 A1* | 8/2009 | Agarwal et al. .................. 726/9 |
| 2009/0219834 A1 | 9/2009 | Babbar et al. |
| 2009/0268737 A1 | 10/2009 | Giles et al. |
| 2009/0304007 A1 | 12/2009 | Tanaka et al. |
| 2010/0071024 A1* | 3/2010 | Eyada ............................... 726/1 |
| 2010/0080238 A1 | 4/2010 | Allan et al. |
| 2010/0238813 A1 | 9/2010 | Allan et al. |
| 2011/0004913 A1 | 1/2011 | Nagarajan et al. |
| 2011/0103259 A1* | 5/2011 | Aybay et al. ................. 370/254 |
| 2012/0131573 A1* | 5/2012 | Dasari et al. ...................... 718/1 |
| 2012/0134291 A1* | 5/2012 | Raleigh ........................ 370/252 |

OTHER PUBLICATIONS

Delker, Jason R., et al., Patent Application entitled, "Dynamic Firewall and Dynamic Host Configuration Protocol Configuration," filed Nov. 13, 2008, U.S. Appl. No. 12/270,537.

Delker, Jason R., et al., Patent Application entitled, "Network Assignment Appeal Architecture and Process," filed Nov. 13, 2008, U.S. Appl. No. 12/270,568.

First Action Interview Pre-Interview Communication dated Apr. 11, 2012, U.S. Appl. No. 12/270,537, filed Nov. 13, 2008.

First Action Interview Office Action dated Jun. 13, 2012, U.S. Appl. No. 12/270,568, filed Nov. 13, 2008.

Notice of Allowance dated Aug. 7, 2012, U.S. Appl. No. 12/270,537, filed on Nov. 13, 2008.

Final Office Action dated Aug. 14, 2012, U.S. Appl. No. 12/270,568, filed on Nov. 13, 2008.

* cited by examiner

FIG. 5
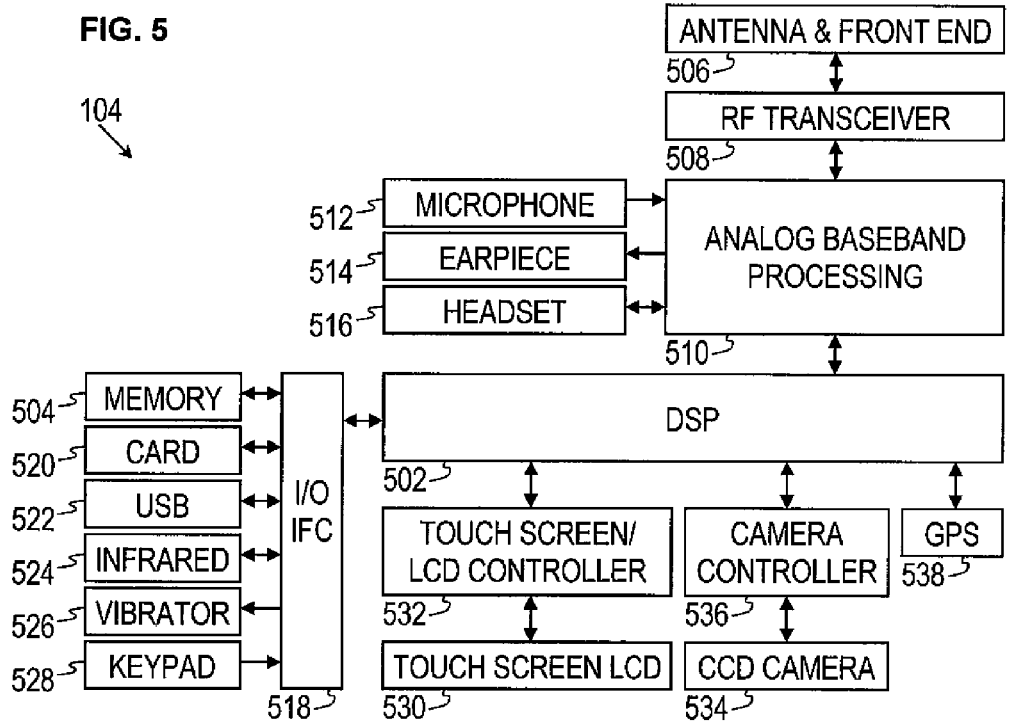
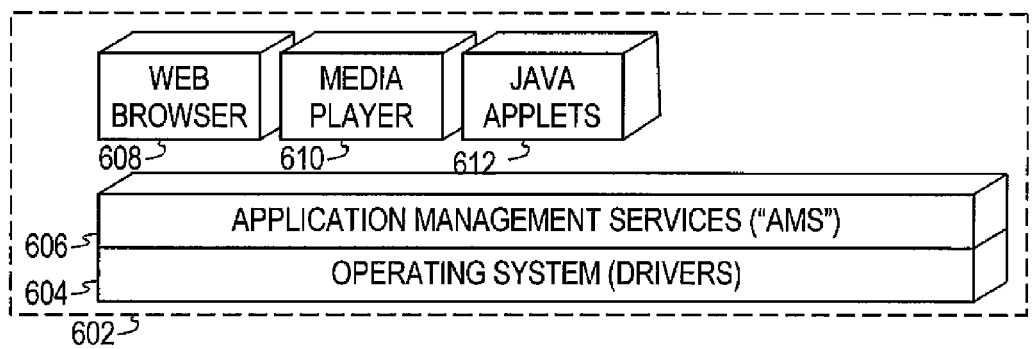
FIG. 6

DYNAMIC NETWORK POLICIES BASED ON DEVICE CLASSIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A party making initial contact with a network to request network services submits credentials and receives account authentication. An accompanying machine account is also confirmed. The user's profile on the network and general user policies combined with resource permissions limit the user's access to network services. Network architects assume that when a typical user authenticates, a general computer is being used. Networks define machine and device accounts broadly and apply generalized policies to them. User, group, and machine accounts access resources outside of their network through network ports on gateway devices that are configured to permit the passage of certain types of network traffic and block all others. Policies describe how generic types of users and groups may access resources in and outside of a network. Policies are general in terms of services allowed, associated traffic types, and access to gateway ports. Policies associated with computer accounts traditionally do not strictly limit traffic types or movement about a network.

SUMMARY

In an embodiment, a dynamic network policies system based on device classification is provided. The system comprises an at least one computer system, a configuration database, and a dynamic network policies application based on device classification that, when executed on the at least one computer system, receives a message from a virtual local area network access component containing a device identity certificate. The application parses the device identity certificate to discover a device classification, references the configuration database to determine a network policy associated with the device classification, and associates the network policy with a virtual local area network definition. The application also sends a reply containing the virtual local area network definition to the virtual local area network access component in response to the request, wherein access to at least some services on a network is made available by association with a virtual local area network, and wherein association with a virtual local network is specific to the device classification and the network policy.

In another embodiment, a method of dynamically assigning network policies based on device classification is provided. The method comprises receiving a message from an access device, the message containing a device identity certificate and a request for access to network services, the request arising from an attempt by a service requester device to access network services. The method also comprises determining the validity of the device identity certificate and parsing the device identity certificate to discover the device classification, the device classification identifying the type of the service requester device requesting access to network services. The method also comprises referencing a database to determine a network policy to apply to the device classification, the network policy describing network services available to the service requester device, the network services delivered to the service requester device through assignment of a virtual local area network to the service requester device. The method also comprises associating the network policy to a virtual local area network to assign to a service requester device and associating the service requester device with the virtual local area network, the virtual local area network either previously established for the device classification associated with the service requester device or dynamically created in response to the request submitted by the service requester device. The method also comprises sending a message to the access device directing the service requester device to be notified of the virtual local area network assignment and access to requested network services.

In another embodiment, a method of dynamically assigning network policies based on device classification is provided. The method comprises receiving a first device identity certificate in a first request for access to network services, the first request originated by a service requester device. The method also comprises validating the first device identity certificate, mapping a first device classification contained in the first device identity certificate to a first network policy, and associating the service requester device with a first virtual local area network based on the first network policy. The method also comprises providing access to network services to the service requester device via the first virtual local area network. The method also comprises receiving a second device identity certificate in a second request for access to network services, the second request originated by the service requester device, validating the second device identity certificate and mapping a second device classification contained in the second device identity certificate to a second network policy. The method also comprises associating the service requester device with a second virtual local area network based on the second network policy and providing access to network services to the service requester device via the second virtual local area network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a mobile device according to an embodiment of the disclosure.

FIG. 6 is a block diagram of a software architecture for a mobile device according to an embodiment of the disclosure.

DETAILED DESCRIPTION

Figure 1:
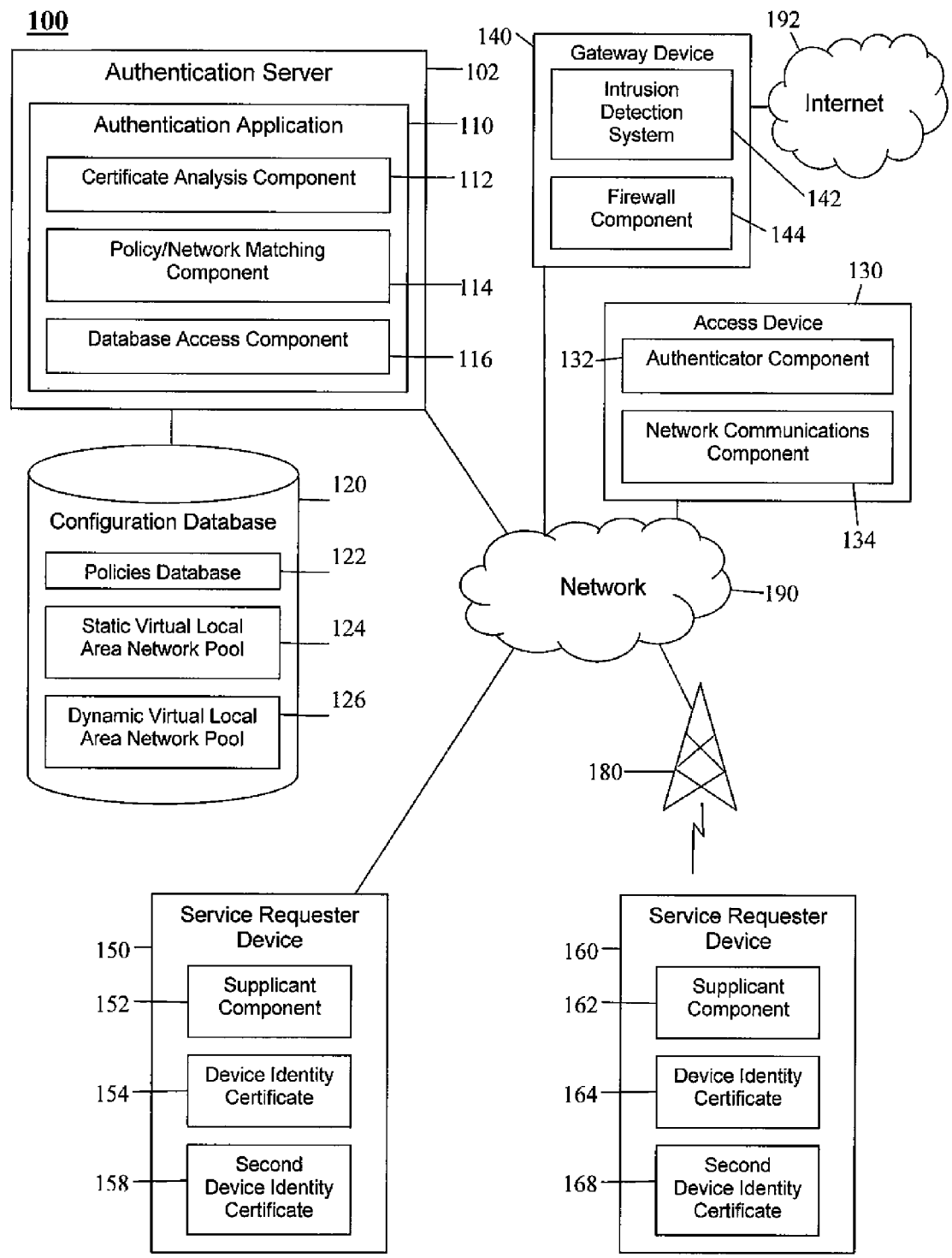
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system for applying network policies based on device classification permit a device seeking access to services available on a network to identify itself and provide a device classification using a digital certificate embedded in the device. A server on the network uses the device classification and other information in the digital certificate to locate a policy to apply to the device that may allow the device access to the requested services. Providing delivery of network services based on device classification may promote improved network security, reduced management burden, and more efficient use of resources including network bandwidth and ports. The digital certificate may also include additional information, for example an identity of the device manufacturer, the model and serial number, Media Access Control (MAC) address, and device function that permit the server to determine trust levels for the device, perform credential checking for the device and its user, and provision virtual local area network (VLAN) assignment for the device. The device, in addition, may store additional certificates that may allow the device to be reclassified on the network as a different type of device and receive access to a different group of services.

The system comprises an authentication server that verifies and parses device identity certificates furnished by devices to discover device classification. The system associates devices to virtual local area networks as the devices connect to the enterprise network and begin to access services. The system also comprises requesting devices that connect to an enterprise network at various times, each requiring a specific range of network services. Network policies may be developed for each class of devices. Network policies group the network services required by each type of device. Network policies may be enforced by causing devices falling within a defined class to join virtual local area networks used only by devices in that class. Devices of other classes may be required to be placed in virtual local area networks specific to that individual device only.

When a device is plugged into or wirelessly connects with a network access point it may identify itself to the network by submitting an electronic device identity certificate. The certificate may be created by the manufacturer of the device, digitally signed, and permanently incorporated into the hardware, firmware, or non-volatile memory of the device. The certificate contains fields that identify the manufacturer, model and serial number, Media Access Control (MAC) address of the device, and the classification or type of device. When the certificate is submitted to a network access device during authentication, the network access device passes the certificate on to an authentication server. After examining the digitally signed certificate for validity, the authentication server parses the certificate to discover device classification, for example mobile phone, computer, or printer. The authentication server may reference a database that contains network policies for different classes of devices. Each network policy permits access to specific network services appropriate to the corresponding device class.

The authentication server associates the device requesting authentication with a virtual local area network specific to the network policy and device class. Associating devices with virtual local area networks specific to the device class allows network policies to be made specific to device classes. Network policies directed solely at certain types of devices may be more finely tuned to the requirements of the device class and better adapted to the risks inherent to devices of that class accessing services on the network. The expanded functionality and power of electronic devices and their access to more diverse types of content and traffic on the Internet and other networks heightens the need to monitor and protect gateway ports. Associating devices with virtual local area networks by device type may reduce these risks and allow more targeted delivery of services based on the device type. In some embodiments, devices may be permitted to reclassify with the authentication server as a different type of device and thereby be associated with a different virtual local area network and receive a different class of services. In an embodiment, the devices may store an additional device identity certificate that may be linked to their primary device identity certificates. Reclassifying and re-authenticating with the additional certificate may permit a device to be seen on the network as a different device and be granted other services or access to a different segment of an enterprise network with enhanced privileges.

Turning to FIG. 1, a system 100 for determining network policies based on device classification is described. The system 100 comprises an authentication server 102, an authentication application 110, a configuration database 120, an access device 130, a gateway device 140, a service requester device 150, a wireless base station 180, a network 190, and an Internet 192. Embodiments of the system 100 typically comprise an indefinite number of additional service requester devices 160.

The authentication server 102 may be any general purpose computer system, as discussed in greater detail hereinafter. The authentication server 102 may comprise one computer or a plurality of computers, for example a server farm wherein many server computers cooperate to share a processing load. The authentication server 102 may comprise a plurality of computers that are located at different places, for example to provide geographical diversity and increased service reliability. The authentication server 102 executes one or more applications that provide services to at least one of the service requester devices 150, 160 including hosting of the authentication application 110.

The authentication application 110 executes on the authentication server 102 and receives messages from the access device 130 containing device identity certificates 154, 164 furnished by the service requester device 150, 160 seeking to authenticate and receive network services. The authentication application 110 comprises the certificate analysis component 112 that receives the device identity certificate 154, verifies the validity of the device identity certificate 154, parses the fields of the device identity certificate 154, and discovers the classification of the service requester device 150 that submitted the request for network services and the accompanying device identity certificate 154. The authentication application 110 also comprises the policy/network matching component 114 that matches network policies drawn from the configuration database 120 with virtual local area networks appropriate to the service requester devices 150 that request network services. In a basic scenario, service requester devices 150, 160 identify their device classification by submitting a device identity certificate 154, 164 that includes a device classification field. Device classification indicates access to certain network services and therefore network policy that groups the services. Network policy designation indicates association with a specific virtual local area network. The policy/network matching component 114 oversees the matching of device classification with network services, network policy, and determination and assignment of virtual local area network for the specific service requester device 150. The authentication application 110 also comprises the database access component 116 that draws information from the configuration database 120 and supplies the information to the policy/network matching component 114 for its use in matching service requester devices 150, 160 with services, policies and virtual local area network assignments. The term authentication application 110 is synonymous with and may be used interchangeably with the term dynamic network policies application based on device classification.

A virtual local area network is a logical local area network that extends beyond a single traditional local area network to a group of local area network segments. A virtual local area network has the same attributes as a physical local area network, but it allows for end stations to be grouped together even if they are not located on the same network switch or segment. Because a virtual local area network is a logical entity, its creation and configuration is done in software instead of by physically relocating devices. Traditional network designs use routers to create broadcast domains and limit broadcasts between multiple subnets. Virtual local area network software permits the same broadcast domain to extend beyond a single segment and provides the segmentation services traditionally provided by routers in local area network configurations. Virtual local area networks may permit control of traffic patterns and more expedient reaction to device relocations. Virtual local area networks may also provide the flexibility to adapt to changes in network requirements and allow for simplified administration including relief from duties of managing resource permissions.

The configuration database 120 is associated with the authentication server 102 and is the repository of information about device classifications and their associated network policies and services included in each policy. The configuration database 120 also contains information about virtual local area networks corresponding to network policies and assignable to device classifications. The configuration database 120 comprises the policies database 122 that defines a network policy for each device classification. For each device classification and corresponding network policy, the policies database 122 lists all of the inbound network services, outbound network services, and other services available to service requester devices 150, 160 in the device classification. The policies database 122 also lists the specific virtual local area network designation for the class of service requester device 150 that submitted its device identity certificate 154. The configuration database 120 also comprises the static virtual local area network pool 124 that contains configuration information for virtual local area networks in the enterprise network that are established a single time for a specific device classification and remain active for use by service requester devices 150.160 only in the specific device classification.

In an embodiment, all printers in an enterprise may be assigned to one virtual local area network, all file servers may be in another virtual local area network, and all web servers may be in yet another specific virtual local area network. In an embodiment, the devices in a hypothetical enterprise network may be assigned with printers only in a first virtual local area network, file servers in a second virtual local area, and web servers only in a third virtual local area network. Network printers, file servers, and web servers are devices that are typically used by more than one user, are rarely reconfigured, seldom change once stable, and require high availability. These devices also require access to a consistent set of specialized network services and need to be virtually and in some cases physically segregated from other types of devices. Statically defined virtual local area networks limited to one device classification each may permit this segregation and may also reduce security risks and other traffic irregularities presented by numerous types of network traffic passing through the virtual local area network and the numerous network ports being accessed.

Other types of devices that may be appropriate for assignment with other devices of the same type to a statically defined virtual local area network are telephones, cameras, and femtocell devices. A femtocell, also known as an access point base station, may be a small cellular base station. Virtual local area networks of these types may retain the same number, name, tag, or other designation, the same internet protocol configuration information including internet protocol (IP) address and subnet mask, and network port on a gateway device 140. The static virtual local area network pool 124 is the repository of information about established and statically defined virtual local area networks and the classification of device assigned to each individual virtual local area network in the pool.

The configuration database 120 also comprises the dynamic virtual local area network pool 126 that contains unassigned virtual local area networks that may be dynamically assigned to service requester devices 150, 160 of certain classifications that require assignment to an individual virtual local area network specific to the device for the duration of the session only. Desktop, laptop, and tablet computers, personal digital assistants (PDAs), and media players are examples of service requester devices 150 that may regularly seek to enter and depart an enterprise network and therefore do not require a steady or static membership in a virtual local area network. Further, as these service requester devices 150, 160 typically are used by individual users with a variety of needs for services and associated network traffic, segregating these service requester devices 150, 160 singly and individually to one virtual local area network per service requester devices 150, 160 per session may promote network security and the allocation of network services in the customized fashion desired by individual users. When a service requester device 150 of one of these classifications plugs into or wirelessly accesses an enterprise network and submits a device identity certificate 154 that identifies its device type, the authentication application 110 dynamically assigns a virtual local area network to the service requester device 150 that it draws from the dynamic virtual local area network pool 126. Numbering, tagging, or naming of these virtual local area networks and association with internet protocol configuration information necessary for instantiation may be random or may be in accordance with a policy adopted by the enterprise.

The assignment of a virtual local area network to a service requester device 150 of this classification is dynamic and may not remain in place once the service requester device 150 logs off and departs the enterprise network. The dynamic virtual local area network pool 126 is the source of virtual local area network information for the authentication server 102 when assigning virtual local area network designations for service requester devices 150, 160 that do not utilize static virtual local area network assignments and instead utilize dynamically assigned virtual local area networks individually assigned and limited in term to the present network session.

The access device 130 is the initial point of contact for a service requester device 150 seeking to access services on an enterprise network. The access device 130 receives the initial transmission from the service requester device 150 that includes the device identity certificate 154 installed on the service requester device 150. As the service requester devices 150, 160 seeking to access network services in the system 100 become connected to a virtual local area network, the access device 130 performs the initial port-based authentication required before a service requester device 150 may be assigned to a virtual local area network. The physical port on the access device 130 initially accessed by the service requester device 150 is closed to network traffic from the service requester device 150 until the access device 130 authenticates the service requester device 150. Port-based authentication is described in standard 802.1x issued by the Institute of Electrical and Electronics Engineers (IEEE) and is well known to those skilled in the art. The access device 130 comprises the authenticator component 132 that performs port-based authentication before the physical port on the access device may be opened and the virtual local area network eventually established for the service requester device 150.

The access device 130 also comprises the network communications component 134 that permits the access device 130 to communicate with other components of the system 100 and forward received traffic to other components of the system 100 as necessary. Concurrent with or shortly after the authenticator component 132 of the access device 130 completes port-based authentication of the service requester device 150 and determines that the access device 130 may open its port and pass traffic from the service requester device 150, the network communications component 134 forwards the device identity certificate 154 provided by the service requester device 150 to the authentication server 102. The network communications component 134 forwards the device identity certificate 154 to the authentication server 102 and relays traffic back from the authentication server 102 to the service requester device 150 including notification that the service requester device 150 has been assigned to a virtual local area network.

The access device 130 may be a single physical device or a plurality of physical devices that have similar functionality and perform substantially the same tasks in connection with the system 100. The access device 130 may be an Ethernet switch, WiFi access point, edge switch, other wireless access point, or other device with the capability to control physical access to a network based on the authentication status of the service requester device 150.

The gateway device 140 provides connection to the Internet 192 for devices on the network 190 through a secure network port or ports on the gateway device 140. The gateway device 140 may be a dedicated physical device or functionality resident on another device that inspects and regulates traffic flowing through its ports. The gateway device 140 is the component of the system 100 through which the service requester device 150 using a virtual local area network makes contact with resources on the Internet 192. The gateway device 140 also may concurrently provide access to the Internet 192 to other devices on the network 190 unrelated to the service requester device 150 and unrelated to security levels and network traffic in connection with the virtual local area network instantiated for the service requester device 150. The gateway device 140 also may concurrently provide access to the Internet 192 to devices that are not components of the system 100. The gateway device 140 has functionality to segregate network traffic intended for the service requester device 150 on a virtual local area network from other traffic originating from the Internet 192 or elsewhere.

The gateway device 140 comprises an intrusion detection system 142 that detects when a service requester device 150 has been compromised by a software virus or other corruption. The gateway device 140 receives advice from another component that a service requester device 150 has been so compromised. The intrusion detection system 142 may recommend to the authentication server 102 that the Media Access Control (MAC) address of the compromised service requester device 150 be classified as corrupted or quarantined and force the service requester device 150 to re-authenticate. Upon subsequent authentication attempts, the compromised service requester device 150 could be placed on a quarantined network segment for remediation. The gateway device 140 also comprises a firewall component 144 that inspects network traffic passing through the gateway device 140 and denies or permits passage based on a set of rules.

The service requester device 150 is a device that requests network services on an enterprise network and contacts the access device 130 with this request. The service requester device 150 contains a device identity certificate 154 created by the manufacturer of the device. The device identity certificate 154 is digitally signed and may be verified by the authentication server 102. The device identity certificate 154 contains a field that identifies the type or classification of device. The service requester device 150 may be any electronic device that requests services on a network, whether that electronic device is functioning primarily in a client role, such as a desktop computer, in a server role, such as a file server or database server, or other role, such as a printer or router. Most instances of a service requester device 150 require network services of some type regardless of their primary function. The service requester device 150 may one of a mobile telephone, desktop telephone, desktop computer, laptop computer, tablet computer, personal digital assistant (PDA), media player, web server, file server, printer, camera, femtocell, access point, switch, router, and voice over Internet protocol (VoIP) device.

The service requester device 150, 160 comprises a supplicant component 152, 162 that furnishes to the access device 130 the device identity certificate 154 installed in its hardware, firmware, or other non-volatile memory by the manufacturer of the service requester device 150. The device identity certificate 154 may contain the credentials needed by the authenticator component 132 to complete port-based authentication or the device identity certificate 154 may be accompanied by additional electronic files that contain the necessary credentials. The device identity certificate 154 may be compliant with the X.509 standard of the International Telecommunications Union (ITU) Telecommunications Standardization Sector (TSS) for public key infrastructure and Privilege Management Infrastructure. The life of the device identity certificate 154 should exceed the physical lifetime of the service requester device 150.

The supplicant component 152 contains reclassification functionality that allows the service requester device 150, 160 to submit a second device identity certificate 158, 168, receive port-based authentication again, if necessary, and receive assignment to a virtual local area network with a different network policy and suite of network services. Although the service requester devices 150, 160 are primarily described in the present disclosure as accessing services on enterprise networks, in some embodiments service requester devices 150, 160 may also access services provided by at least one of a public network and a private network and may comprise at least one of a local area network (LAN), wide area network (WAN), internetwork, intranet, and extranet.

The wireless base station 180 may be any of a mobile telephone wireless base station, for example a Code Division Multiple Access (CDMA), Global System for Mobile Communications (GSM), and/or Universal Mobile Communications System (UMTS) mobile telephone wireless base station; a World-wide interoperable Microwave Access (WiMAX) base station; a WiFi access point; or other wireless access device.

The network 190 promotes communication between the components of the system 100. The network 190 may be any communication network including a public data network (PDN), a public switched telephone network (PSTN), a private network, and/or a combination thereof.

The Internet 192 is a worldwide, publicly accessible series of interconnected computer networks that transmit data by packet switching using the standard internet protocol (IP). In an embodiment, the Internet 192 may be any network external to the network 190 to which the client device 150, 160 wishes to connect its virtual local area network.

Figure 2:
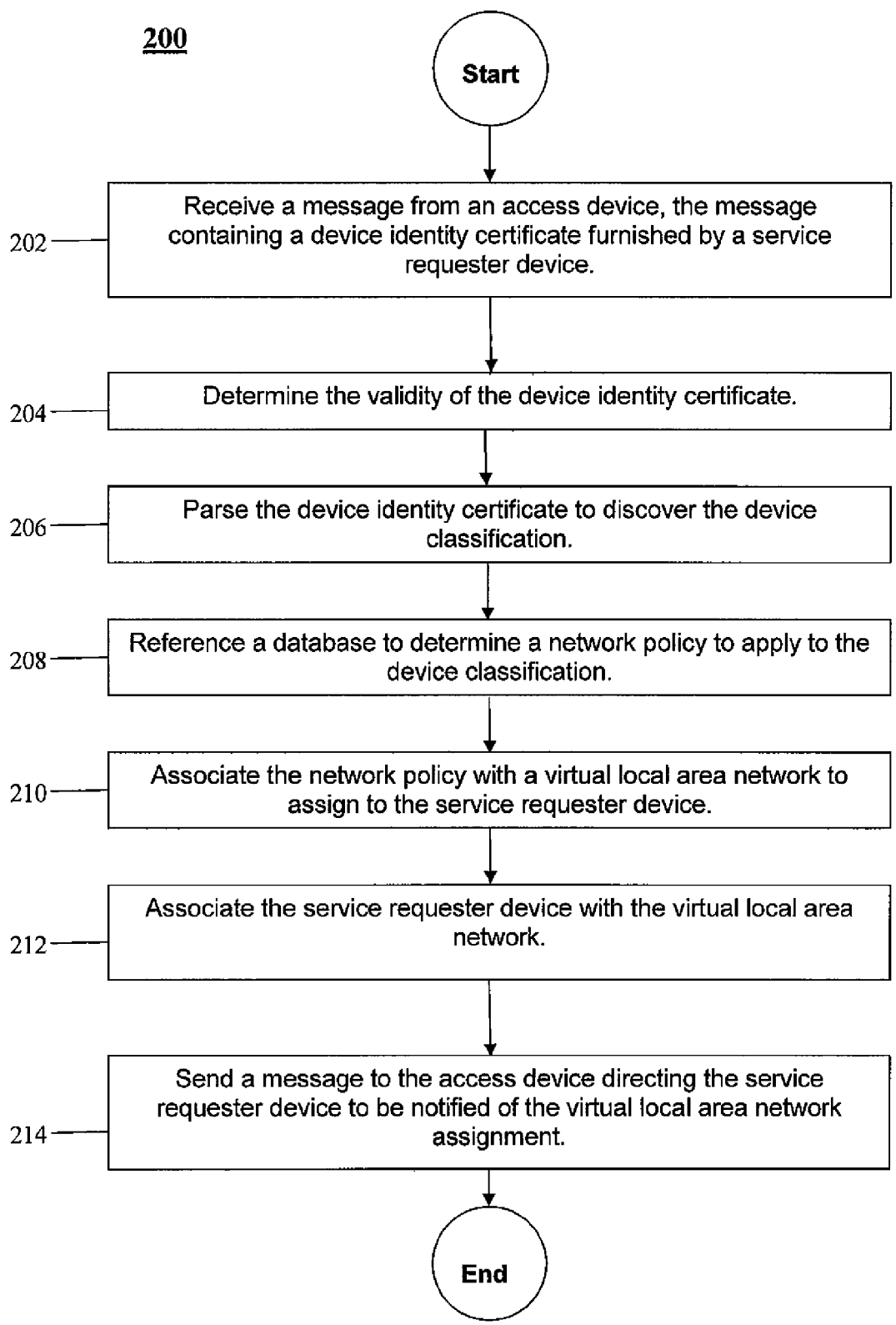
FIG. 2 is a flow chart illustrating a method according to an embodiment of the disclosure.

Turning now to FIG. 2, a method 200 for dynamically assigning network policies based on device classification is provided. Beginning at block 202, the authentication server 102 receives a message from the access device 130. The message contains a device identity certificate 154 submitted by a service requester device 150 requesting access to network services.

At block 204, the certificate analysis component 112 of the authentication application 110 examines the device identity certificate 154 and verifies that it is the true and accurate device identity certificate 154 installed into the hardware, firmware, or other non-volatile memory of the service requester device 150 by the manufacturer of the service requester device 150. The device identity certificate 154 is digitally signed by the manufacturer. The certificate analysis component 112 may have electronic files furnished by the manufacturer of the service requester device 150 that enable the certificate analysis component 112 to analyze the device identity certificate 154 and make certain that it is valid. Alternatively, the certificate analysis component 112 may access a certificate authority (CA) (not shown) to validate the certificate.

At block 206, the certificate analysis component 112 parses the device identity certificate 154 to discover the device classification of the service requester device 150. Device classification as discovered by the certificate analysis component 112 may correspond to device classifications listed in the policies database 122.

At block 208, the database access component 116 accesses the configuration database 120 to draw information to match the device classification drawn from the device identity certificate 154 with a network policy and thereby determine a virtual local area network to assign to the service requester device 150. The database access component 116 provides the information to the policy/network matching component 114 that determines the correct network policy to apply to the service requester device 150 that submitted the device identity certificate 154. The network policy describes inbound and outbound network services and other network services provided to service requester devices 150, 160 of the corresponding device classification. Network services may be services provided by the internet protocol suite of network services and deal with accessing ports on gateway devices and other network devices. At block 208, policy/network matching component 114 matches device classification with network policy found in the policies database 122.

At block 210, the policy/network matching component 114 matches the network policy found at block 208 corresponding to device classification with a virtual local area network in which the service requester device 150 will be placed. When the service requester device 150 is of a classification that has an established and continuing virtual local area network for all service requester devices 150 of that classification, that specific virtual local area network will be identified. File servers, web servers, printers, and cameras are examples of service requester devices 150 that may fall within this classification. When the service requester device 150 is of a classification that receives a dynamically created virtual local area network with one virtual local area network created per individual service requester device 150, the policy/network matching component 114 will draw from the dynamic virtual local area network pool 126 the tagging and internet protocol information necessary to dynamically create a virtual local area network for the service requester device 150. Computers, personal digital assistants, and media players are examples of service requester devices 150, 160 that fall within this classification. At block 210, the established virtual local area network is either identified for the service requester device 150 or a new virtual local area network is dynamically created for the service requester device 150. With dynamically created virtual local area networks, the policies for a specific virtual local area network may still at least in part be based on device classification.

At block 212, the service requester device 150 is associated with the virtual local area network identified or dynamically created for the service requester device 150 at block 210. At block 214, the authentication server 102 sends a message to the access device 130 directing that the service requester device 150 be notified that the service requester device 150 has been associated with a specific virtual local area network and may access network services associated with the virtual local area network.

Figure 3:
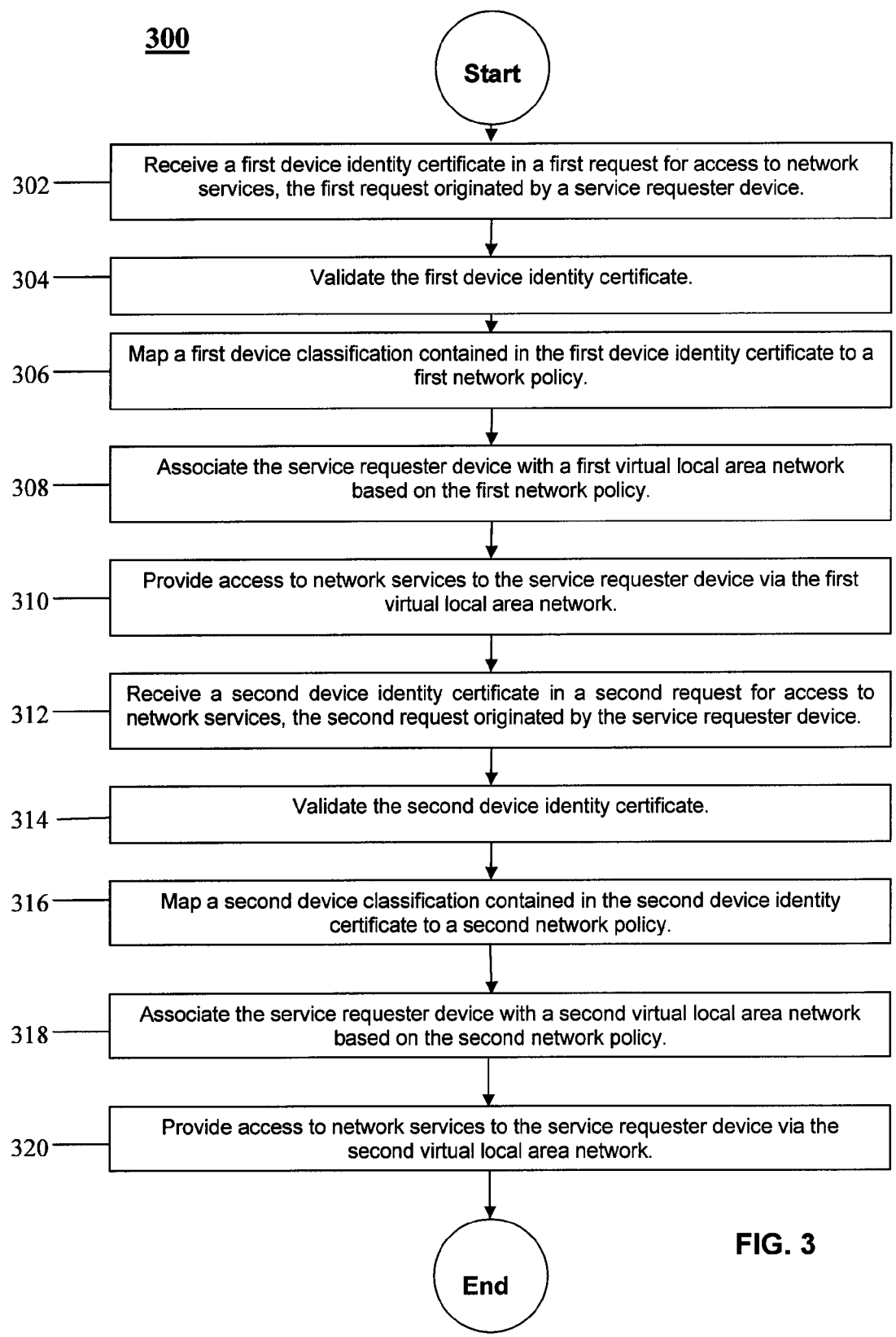
FIG. 3 is a flow chart illustrating another method according to an embodiment of the disclosure.

Turning now to FIG. 3, a method 300 for a service requester device 150 to submit a second device identity certificate 158 with a different device classification, reclassify in the system 100 as the different type of device, and receive different services is provided. The supplicant component 152 of the service requester device 150 contains reclassification functionality that permits the service requester device 150 to complete this process. In an embodiment, a service requester device 150 may contain additional hardware or software functionality such that the service requester device 150 may reclassify with the authentication server 102, be associated with a different network policy with associated different network services, and be assigned to a different virtual local area network than previously. The method 300 describes a service requester device 150 initially submitting a device identity certificate 154, being associated with a network policy and virtual local area network, and commencing activity in the system 100 as described in detail in the method 200. After a time period, the service requester device 150 discontinues its association with the virtual local area network, and the supplicant component 152 submits the second device identity certificate 158. The second device identity certificate 158 is subjected to a validation and parsing process similar to the process performed on the device identity certificate 154. The service requester device 150 is then associated with the different network policy and virtual local area network requested and begins receiving network services associated with the reclassification.

Beginning at block 302, the authentication application 110 receives a first device identity certificate from the service requester device 150. In the method 300, the first device identity certificate as described in FIG. 3 is analogous to the device identity certificate 154 as described in the system 100 and the terms may be used interchangeably. At block 304, the device identity certificate 154 is validated by the certificate analysis component 112 and at block 306 the device classification is determined and mapped to a network policy. At block 308, the service requester device 150 is associated with a virtual local area network associated with the network policy, and at block 310 the service requester device 150 is provided access to network services in connection with its association with the virtual local area network. In the method 300, the user of the service requester device 150 may choose to activate the software or hardware functionality of the service requester device 150 that requires it to reclassify as a different device by submitting a second device identity certificate 158.

The service requester device 150 terminates its association with the virtual local area network established at block 308. The initial preliminary step of port-based authentication may also have to be completed by the supplicant component 152 and the authenticator component 132 for the port on the access device 130 to be reopened. At block 312 the supplicant component 152 of the service requester device 150 submits the second device identity certificate 158 to initiate the process of reclassifying as a different device and receiving the network services associated with the second device classification. The certificate analysis component 112 receives the second device identity certificate 158. At block 314, the certificate analysis component 112 validates the second device identity certificate 158. Because the second device identity certificate 158 may not have been created and placed in the hardware, firmware or non-volatile memory of the service requester device 150 by the manufacturer of the service requester device 150, the certificate analysis component 112 may need to take extra steps to verify that the second device identity certificate 158 is valid.

The second device identity certificate 158 may be associated with the Media Access Control address of the service requester device 150. The second device identity certificate 158 may also contain an encrypted or otherwise verifiable link to the device identity certificate 154 placed by the manufacturer of the service requester device 150. Once validation is completed, the steps for the service requester device 150 in its new classification to receive services match the steps in blocks 302 through 310. At block 316, the service requester device 150 in its secondary classification is mapped to the network policy associated with the secondary classification. At block 318 the service requester device 150 is associated with a second virtual local area network and at block 320 the service requester device 150 is provided access to the network services associated with the second virtual local area network.

In an embodiment of the method 300, a service requester device 150 that is primarily a generic computer assigned to a user that logs on daily and receives a typical set of network services may contain software functionality enabling the service requester device 150 to make telephone calls using voice-over-internet protocol (VoIP). In an embodiment, it may be prudent for one network policy to be applied to the device when it functions as a computer and another network policy to be applied when it functions as a telephone. For purposes of the method 300, the device may be seen as two separate instances of a service requester device 150 depending on whether the device is functioning as a computer or telephone. When the service requester device 150 is being operated in its standard role as a computer, the device identity certificate 154 would be submitted, verified, parsed, and associated with a network policy corresponding to a computer. The service requester device 150 would be placed in a dynamically created virtual local area network with the standard set of network services provided to all standard computer devices. The telephone functionality could not be used because the network services for the network policy and corresponding virtual local area network presently in effect do not include the voice-over-internet protocol or permit related traffic. When an authorized user wishes to use the telephone functionality of the device, a second device identity certificate 158 may be submitted to the access device 130 and passed on to the authentication server 102. When the second device identity certificate 158 is verified and parsed, the service requester device 150 will be classified as a telephone. It will be associated with a network policy and placed in a virtual local area network receiving network services allowing it to make telephone calls using the voice-over-internet protocol. In the embodiment, the second device identity certificate 158 would be linked to the device identity certificate 154 such that the validity of the second device identity certificate 158 could be determined. The second device identity certificate 158 may be produced by a vendor of the voice-over-internet protocol or other internet telephony software or services.

While the present disclosure provides for the device identity certificate 154, 164 to be produced and placed in the service requester device 150, 160 by the manufacturer of the service requester device 150, 160, in some embodiments, the second device identity certificate 158, 168 may be created by a third party that produced or sold additional hardware or software installed into the service requester device 150, 160 providing additional functionality. In an embodiment, the second device identity certificate 158, 168 may be created by the party that owns and/or operates the enterprise network accessed by the service requester device 150, 160 and operates its own certificate authority. In an embodiment, the authentication application 110 may be configured to allow only second device identity certificates 158, 168 to be presented by certain service requester devices 150, 160 to be matched with certain certificate authorities.

Figure 4:
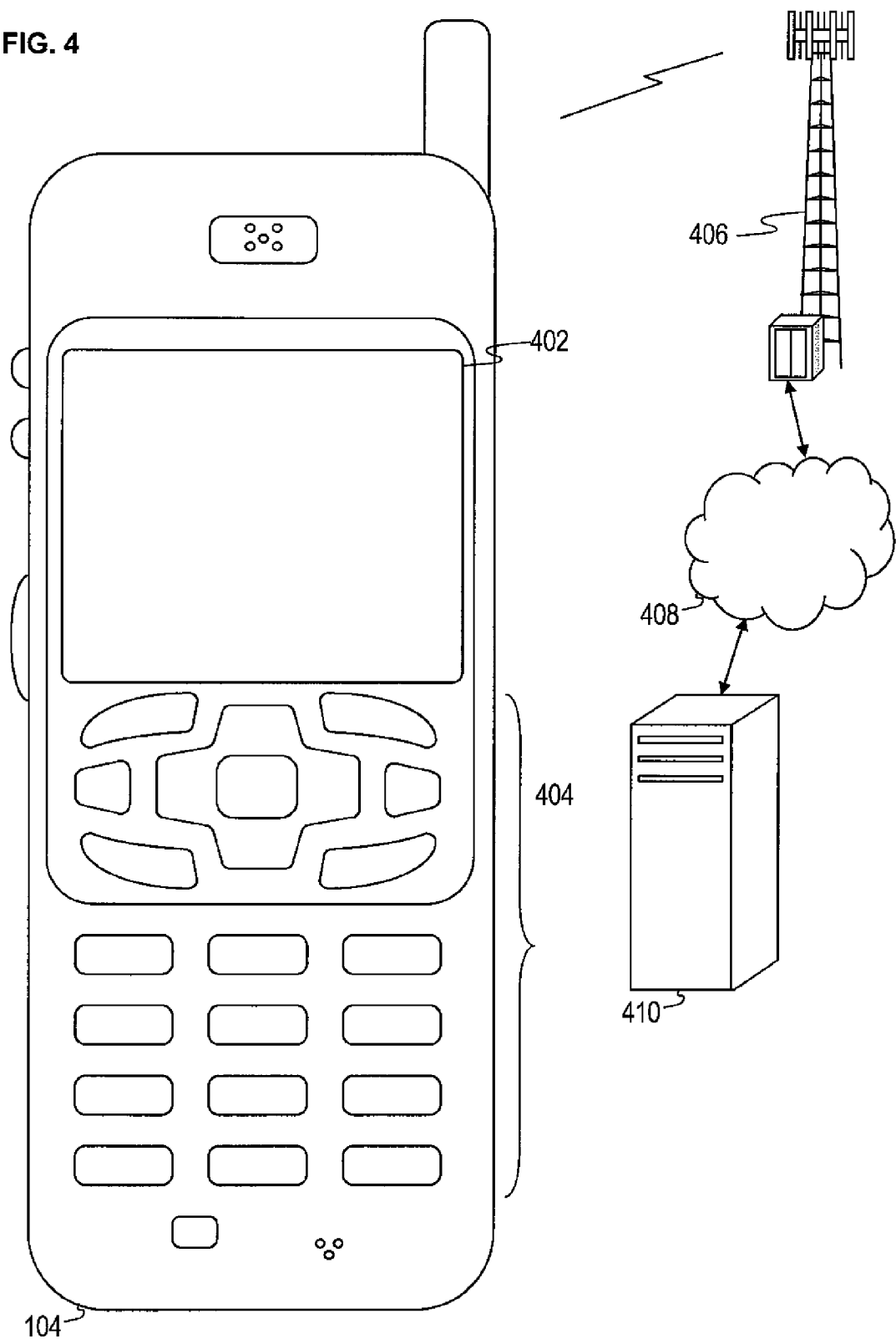
FIG. 4 is an illustration of a mobile device according to an embodiment of the disclosure.

FIG. 4 shows a wireless communications system including the mobile device 104. FIG. 4 depicts the mobile device 104, which is operable for implementing aspects of the present disclosure, but the present disclosure should not be limited to these implementations. Though illustrated as a mobile phone, the mobile device 104 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 104 is not a general purpose computing device like a portable, laptop or tablet computer, but rather is a special-purpose communications device such as a mobile phone, wireless handset, pager, or PDA. The mobile device 104 may support specialized activities such as gaming, inventory control, job control, and/or task management functions, and so on.

The mobile device 104 includes a display 402 and a touch-sensitive surface or keys 404 for input by a user. The mobile device 104 may present options for the user to select, controls for the user to actuate, and/or cursors or other indicators for the user to direct. The mobile device 104 may further accept data entry from the user, including numbers to dial or various parameter values for configuring the operation of the handset. The mobile device 104 may further execute one or more software or firmware applications in response to user commands. These applications may configure the mobile device 104 to perform various customized functions in response to user interaction. Additionally, the mobile device 104 may be programmed and/or configured over-the-air, for example from a wireless base station, a wireless access point, or a peer mobile device 104.

The mobile device 104 may execute a web browser application which enables the display 402 to show a web page. The web page may be obtained via wireless communications with a base transceiver station (BTS) 406, a wireless network access node, a peer mobile device 104 or any other wireless communication network or system. While a single base transceiver station 406 is illustrated, it is understood that the wireless communication system may comprise additional base transceiver stations. In some instances, the mobile device 104 may be in communication with multiple base transceiver stations 406 at the same time. The base transceiver station 406 (or wireless network access node) is coupled to a wired network 408, such as the Internet. Via the wireless link and the wired network, the mobile device 104 has access to information on various servers, such as a server 410. The server 410 may provide content that may be shown on the display 402. Alternately, the mobile device 104 may access the base transceiver station 406 through a peer mobile device 104 acting as an intermediary, in a relay type or hop type of connection.

FIG. 5 shows a block diagram of the mobile device 104. While a variety of known components of handsets 104 are depicted, in an embodiment a subset of the listed components and/or additional components not listed may be included in the mobile device 104. The mobile device 104 includes a digital signal processor (DSP) 502 and a memory 504. As shown, the mobile device 104 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 104 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 104 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 104 to send and receive information from a radio access network (RAN) or some other available wireless communications network or from a peer mobile device 104. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 104 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 104 to function as a peripheral device to exchange information with a personal computer or other computer system. The infrared port 524 and other optional ports such as a Bluetooth interface or an IEEE 802.11 compliant wireless interface may enable the mobile device 104 to communicate wirelessly with other nearby handsets and/or wireless base stations.

The input/output interface 518 may further connect the DSP 502 to the vibrator 526 that, when triggered, causes the mobile device 104 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 104. Another input mechanism may be the touch screen LCD 530, which may also display text and/or graphics to the user. The touch screen LCD controller 532 couples the DSP 502 to the touch screen LCD 530.

The CCD camera 534 enables the mobile device 104 to take digital pictures. The DSP 502 communicates with the CCD camera 534 via the camera controller 536. The GPS sensor 538 is coupled to the DSP 502 to decode global positioning system signals, thereby enabling the mobile device 104 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 104. Also shown in FIG. 6 are a web browser application 608, a media player application 610, and JAVA applets 612. The web browser application 608 configures the mobile device 104 to operate as a web browser, allowing a user to enter information into forms and select links to retrieve and view web pages. The media player application 610 configures the mobile device 104 to retrieve and play audio or audiovisual media. The JAVA applets 612 configure the mobile device 104 to provide games, utilities, and other functionality.

Figure 7:
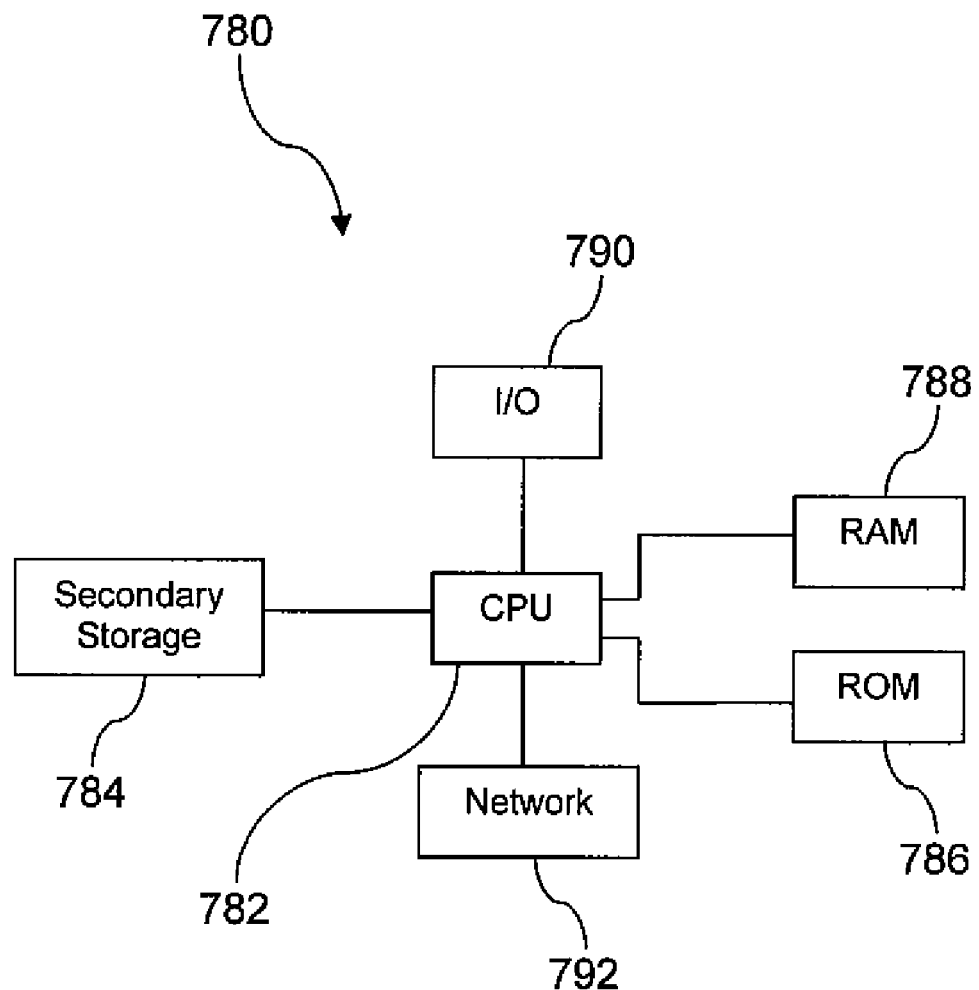
FIG. 7 is an illustration of a general purpose computer system suitable for implementing some embodiments of the disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic network policies system based on device classification, comprising:
    an at least one computer system;
    a configuration database; and
    a dynamic network policies application based on device classification that, when executed on the at least one computer system,
        receives a message from a virtual local area network access component containing a device identity certificate in response to a device seeking access to services on a network, wherein the device identity certificate comprises the device classification,
        parses the device identity certificate to discover the device classification,
        references the configuration database based on the device classification to determine a network policy of a plurality of network policies associated with the device classification, wherein each of the plurality of network policies is associated with a different device classification, and wherein each of the plurality of network policies groups network services for the corresponding device classification,
        associates the network policy with a virtual local area network definition, and
        sends a reply containing the virtual local area network definition to the virtual local area network access component in response to the request,
    wherein access to at least some of the services on the network is made available by association with a virtual local area network, and
    wherein association with the virtual local area network is specific to the device classification and the network policy.

2. The system of claim 1, further including the device that seeks to access network services and sends a request for network services to the virtual local area network access component including the device identity certificate.

3. The system of claim 2, wherein the device identity certificate is incorporated into one of the hardware, firmware, and non-volatile memory of the device by the manufacturer of the device.

4. The system of claim 2, wherein the device identity certificate complies with the X.509 standard of the International Telecommunications Union Telecommunications Standardization Sector for public key infrastructure and Privilege Management Infrastructure.

5. The system of claim 2, wherein the device identity certificate identifies the manufacturer of the device, the Media Access Control (MAC) address of the device, the serial number of the device, the model number of the device, and the classification of the device.

6. The system of claim 1, wherein the virtual local area network is one of predefined for the device classification and dynamically created for the device classification.

7. The system of claim 2, wherein the virtual local area network access component receives the device identity certificate from the device requesting access to network services and assigns the virtual local area network designation received from the dynamic network policies application based on device classification to the device requesting access.

8. A method of dynamically assigning network policies based on device classification, comprising:
    receiving a message from an access device in response to a service requester device attempting to access network services, the message containing a device identity certificate and a request for access to network services, the request arising from an attempt by the service requester device to access network services, wherein the device identity certificate comprises a device classification;
    determining the validity of the device identity certificate;
    parsing the device identity certificate to discover the device classification, the device classification identifying the type of the service requester device requesting access to network services;
    referencing a table based on the device classification to determine a network policy of a plurality of network policies to apply to the device classification, the network policy describing network services available to the service requester device, the available network services delivered to the service requester device through assignment of a virtual local area network to the service requester device, wherein each of the plurality of network policies is associated with a different device classification, and wherein each of the plurality of network policies groups network services for the corresponding device classification;
    associating the network policy to the virtual local area network to assign to a service requester device;
    associating the service requester device with the virtual local area network, wherein the virtual local area network is previously established for the device classification associated with the service requester device or dynamically created in response to the request submitted by the service requester device, and wherein association with the virtual local area network is specific to the device classification and the network policy; and
    sending a message to the access device directing the service requester device to be notified of the virtual local area network assignment and access to requested network services.

9. The method of claim 8, wherein the service requester device is one of a mobile telephone, desktop telephone, desktop computer, laptop computer, tablet computer, personal digital assistant, media player, web server, file server, printer, camera, femtocell, access point, switch, and router.

10. The method of claim 8, wherein the device identity certificate is created and digitally signed by the manufacturer of the service requester device.

11. The method of claim 8, wherein a first service requester device having a first device classification is assigned to a previously established virtual local area network associated with the first device classification and a second service requester device having a second device classification is individually assigned to a virtual local area network dynamically and exclusively created upon request.

12. The method of claim 8, wherein the available network services comprise inbound network services, outbound network services, and other network services.

13. The method of claim 8, wherein the device identity certificate is used by the service requester device to receive 802.1x port-based authentication from the access device.

14. The method of claim 8, wherein at least one of trusted network entities and services on the network determine that a service requester device has been compromised and directs that the service requester device re-authenticate and subsequently be moved to a quarantined network segment for remediation.

15. A method of dynamically assigning network policies based on device classification, comprising:

receiving a first device identity certificate in a first request for access to network services in response to a service requester device seeking access to services on a network, the first request originated by the service requester device, wherein the first device identity certificate comprises a first device classification;

validating the first device identity certificate;

mapping the first device classification contained in the first device identity certificate to a first network policy of a plurality of network policies based on the first device classification, wherein each of the plurality of network policies is associated with a different device classification, and wherein each of the plurality of network policies groups network services for the corresponding device classification;

associating the service requester device with a first virtual local area network based on the first network policy, wherein the association with the first virtual local area network is specific to the first device classification and the first network policy;

providing access to network services associated with the first device classification to the service requester device via the first virtual local area network;

receiving a second device identity certificate in a second request for access to network services, the second request originated by the service requester device, wherein the second device identity certificate comprises a second device classification;

validating the second device identity certificate;

mapping the second device classification contained in the second device identity certificate to a second network policy;

associating the service requester device with a second virtual local area network based on the second network policy, wherein the association with the second virtual local area network is specific to the second device classification and the second network policy; and providing access to network services associated with the second device classification to the service requester device via the second virtual local area network.

16. The method of claim 15, wherein the service requester device provides a first functionality based on network services accessed via the first virtual local area network and provides a second functionality based on network services accessed via the second virtual local area network.

17. The method of claim 15, wherein the validity of the first device identity certificate is used to support the validity of the second device identity certificate.

18. The method of claim 15, wherein associating the service requester device with the second virtual local area network causes the disassociation of the service requester device with the first virtual local area network.

19. The method of claim 15, wherein the second device identity certificate is associated with the Media Access Control address of the service requester device.

20. The method of claim 15, wherein associating the service requester device with the second virtual local area network provides the service requester device access to different enterprise networks while remaining physically or wirelessly connected to the same network access point.

\* \* \* \* \*